United States Patent
Mochizuki

[11] Patent Number: 6,002,843
[45] Date of Patent: *Dec. 14, 1999

[54] PRINTING APPARATUS AND ITS CONTROL METHOD

[75] Inventor: Yasushi Mochizuki, Zushi, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/888,293

[22] Filed: Jul. 3, 1997

Related U.S. Application Data

[63] Continuation of application No. 08/490,085, Jun. 13, 1995, abandoned.

[30] Foreign Application Priority Data

Jun. 15, 1994 [JP] Japan .................................. 6-132893
Jun. 2, 1995 [JP] Japan .................................. 7-136821

[51] Int. Cl.⁶ .................................................. G06F 15/00
[52] U.S. Cl. ........................................ 395/112; 395/114
[58] Field of Search .................................. 395/112, 114, 395/113, 101, 117, 500, 115, 116, 106, 105, 107, 825, 826, 827, 527, 385, 568; 358/445, 467, 470, 468, 407, 442, 444, 452, 434, 435, 436, 438, 439; 364/578; 347/142; 400/61, 62, 70, 71, 76, 77; 382/225, 218, 219

[56] References Cited

U.S. PATENT DOCUMENTS

| | | |
|---|---|---|
| 4,992,957 | 2/1991 | Aoyama et al. .................... 395/112 |
| 5,075,874 | 12/1991 | Steeves et al. .................... 395/112 |
| 5,165,014 | 11/1992 | Vassar ............................... 395/112 |
| 5,222,200 | 6/1993 | Callister et al. .................. 395/112 |
| 5,268,993 | 12/1993 | Ikenoue et al. ................... 395/114 |
| 5,293,466 | 3/1994 | Bringmann ........................ 395/114 |
| 5,303,336 | 4/1994 | Kageyama et al. ............... 395/112 |
| 5,332,320 | 7/1994 | Ohara ................................. 395/112 |
| 5,371,837 | 12/1994 | Kimber et al. .................... 395/112 |
| 5,388,920 | 2/1995 | Ohara ................................. 395/112 |
| 5,392,419 | 2/1995 | Walton ............................... 395/112 |
| 5,469,373 | 11/1995 | Kashiwazaki et al. ............ 395/112 |

*Primary Examiner*—Dov Popovici
*Attorney, Agent, or Firm*—Fitzpatrick, Cella, Harper & Scinto

[57] ABSTRACT

A printing device which has a plurality of emulation programs and analyzes input data based on one of the plurality of emulation programs. The printing device includes a replacement unit for replacing a plurality of different commands having a common meaning included in the input data by a predetermined different command having the common meaning using a command replacement table. A comparison unit compares the predetermined different command replaced by the replacement unit with a command in a command table. A selection unit selects one of the plurality of emulation programs corresponding to the command in the command table in response to the comparison.

13 Claims, 12 Drawing Sheets

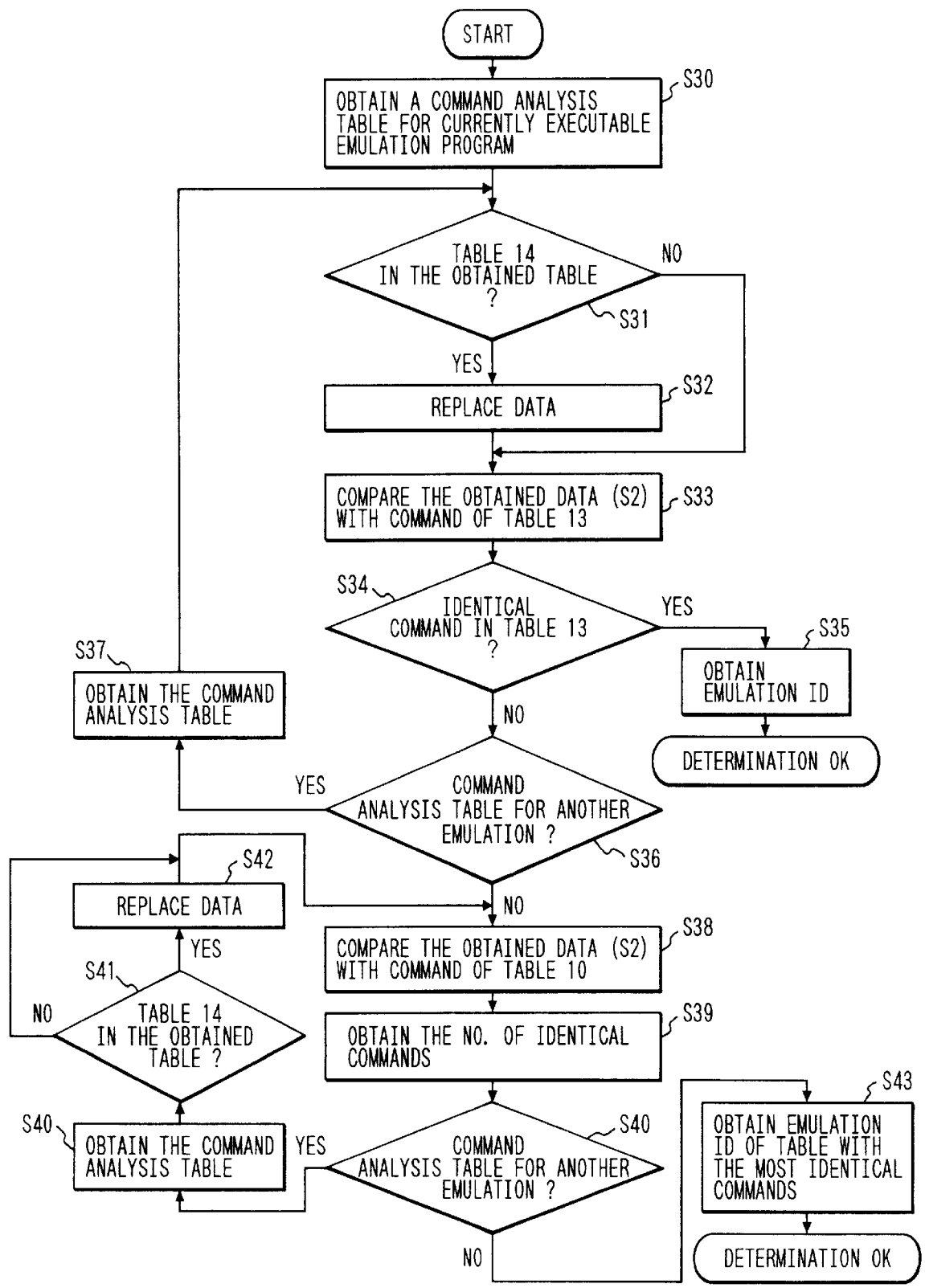

PRINTING APPARATUS AND ITS CONTROL METHOD

This application is a continuation of application Ser. No. 08/490,085, filed Jun. 13, 1995, now abandoned.

BACKGROUND OF THE INVENTION

1. Field of the Invention

The present invention relates to a printing apparatus and its control method having a plurality of emulation programs to output data using an emulation program adapted to the input data.

2. Related Background Art

Conventionally, in the printing apparatus having a plurality of emulation programs, the following methods for switching the emulation program have been provided.

1. An emulation identification command is input prior to the print data, and the emulation program is switched in accordance with it.

2. A predetermined amount of data among the print data received is compared with the command code of each emulation program, its use frequency is calculated, and the emulation program is switched in accordance with the calculated value.

However, in the first method of the conventional example as above mentioned, it is necessary to know in advance the emulation program to be used, while in the second method, it takes a lot of time to discriminate the emulation program.

Also, in the second method, the command which each emulation program interprets contained in the received data is analyzed, but if a command analysis table where the commands usable for the analysis are registered is contained within the control program of controlling the printing apparatus, an automatic emulation switching function is only operable under the support of predetermined emulation programs, whereby there was a drawback that a newly supported emulation program could not be operated.

Also, there may be a plurality of commands having the same meaning, depending on the emulation, whereby there was a drawback that it took a lot of time in discriminating the emulation program to separately register or retrieve such commands in or from the command table.

SUMMARY OF THE INVENTION

The present invention has been achieved in the light of the aforementioned drawbacks associated with the conventional arts, and its object is to provide a printing apparatus and its control method which is capable of discriminating an emulation program from input print data in a short time, and further, dealing with the addition of a new emulation program and the addition of a command to the existing emulation program.

To achieve the above object, a printing apparatus of the present invention is configured as follows:

A printing apparatus having a plurality of emulation programs, includes:
  registration means for registering the feature information of each emulation program in correspondence to said emulation program,
  determination means for determining an emulation program adapted to input print data by collating said input print data with the feature information registered by said registration means, and
  print control means for the print out by executing the emulation program adapted to said print data in accordance with a determination by said determination means.

Also, a print control method of the present invention is configured as follows:

A control method for a print apparatus having a plurality of emulation program, includes:
  a determination step for determining an emulation program adapted to the input print data by collating the feature information corresponding to each emulation program with said input print data, and
  a print control step for the print out by executing the emulation program adapted to said print data in accordance with a determination by said determination step.

With the above configuration, the print data is collated with the feature information corresponding to each emulation program to determine the emulation program.

BRIEF DESCRIPTION OF THE DRAWINGS

FIG. 11 is a flowchart for explaining a command analysis procedure in the third example.

DETAILED DESCRIPTION OF THE PREFERRED EMBODIMENTS

[First example]

A printing apparatus in a first example of the present invention will be described below in detail with reference to the drawings.

Figure 1:
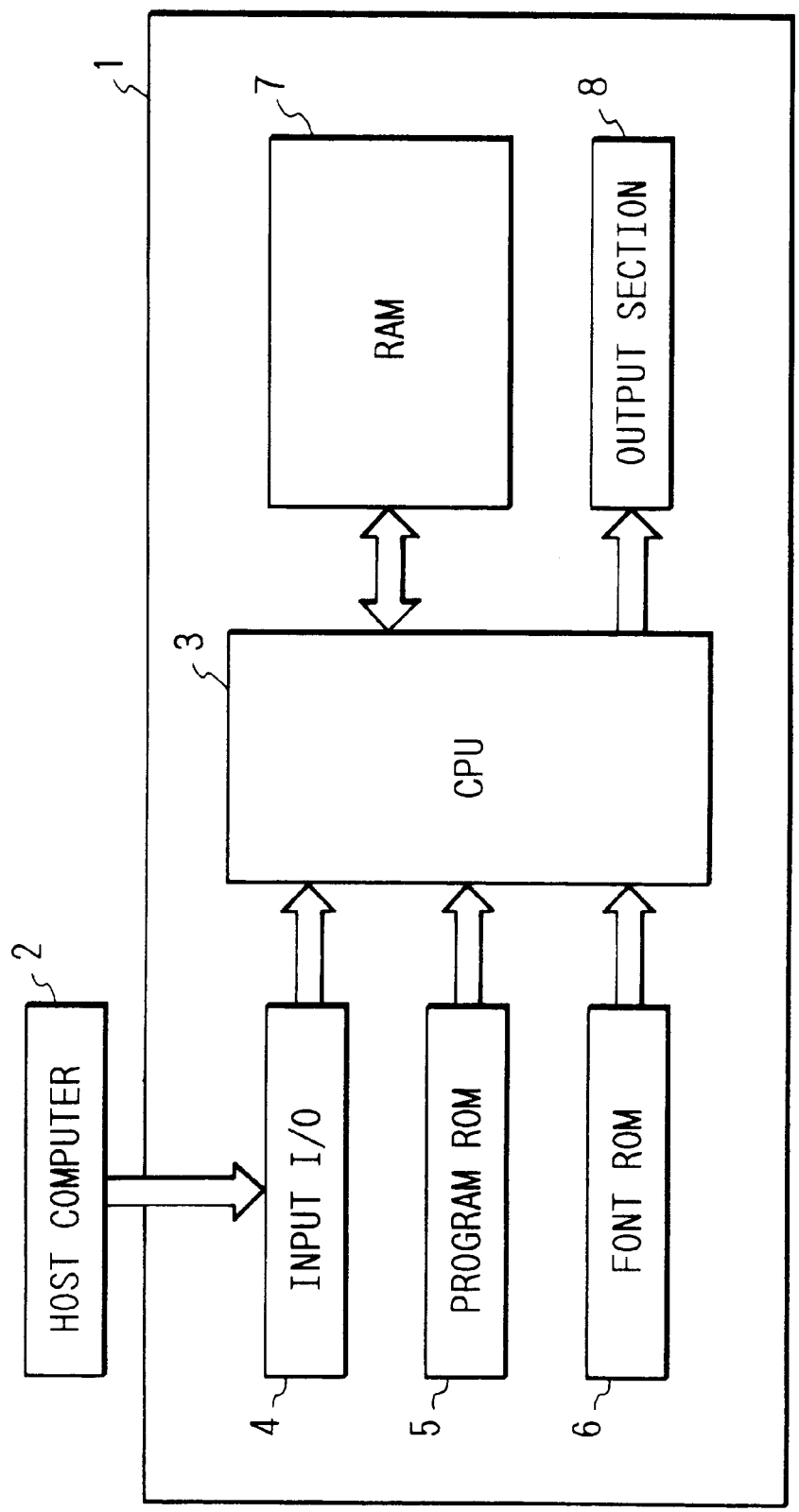
FIG. 1 is an overall configurational diagram of a printing apparatus in one example of the present invention.
Figure 3:
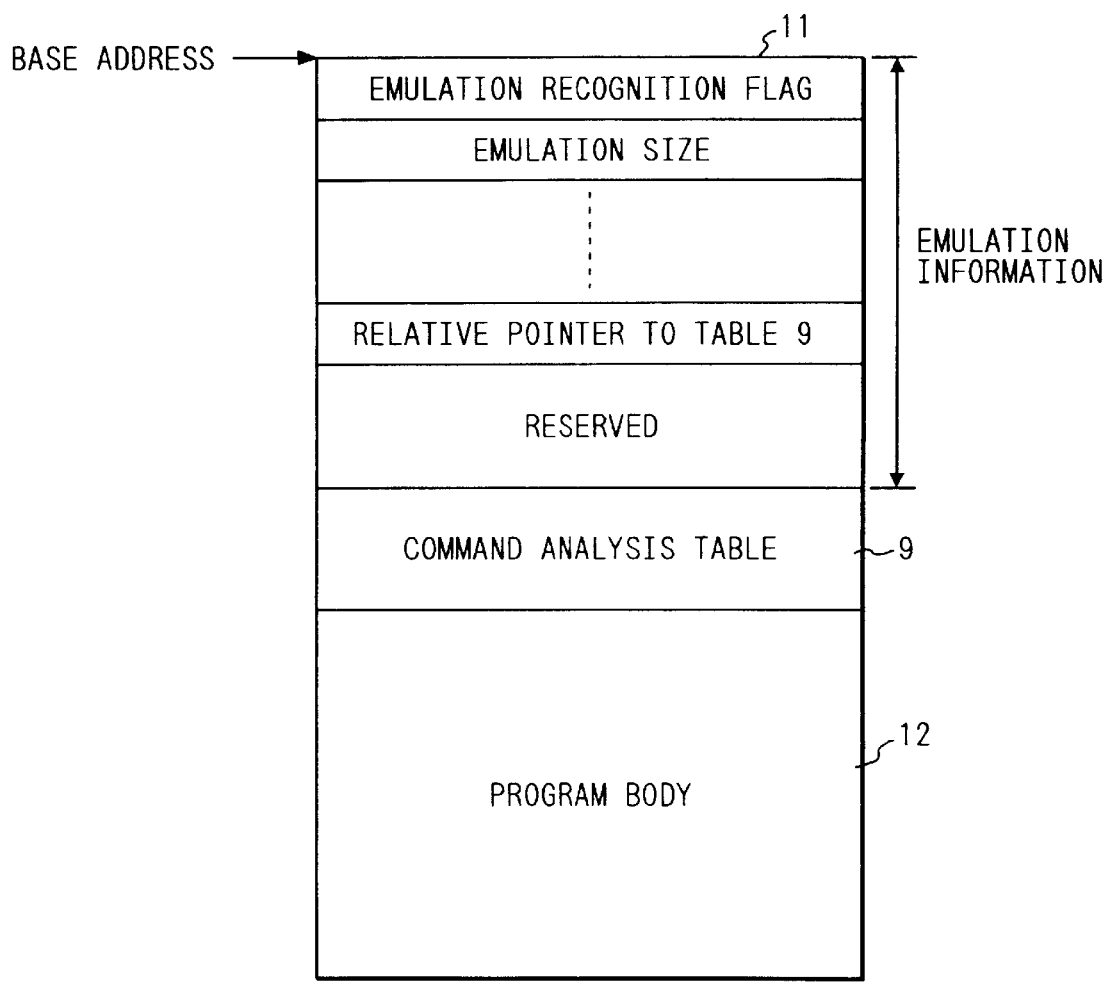
FIG. 3 is a configurational diagram of an emulation information part when each emulation program is provided with a command analysis table.
Figure 5:
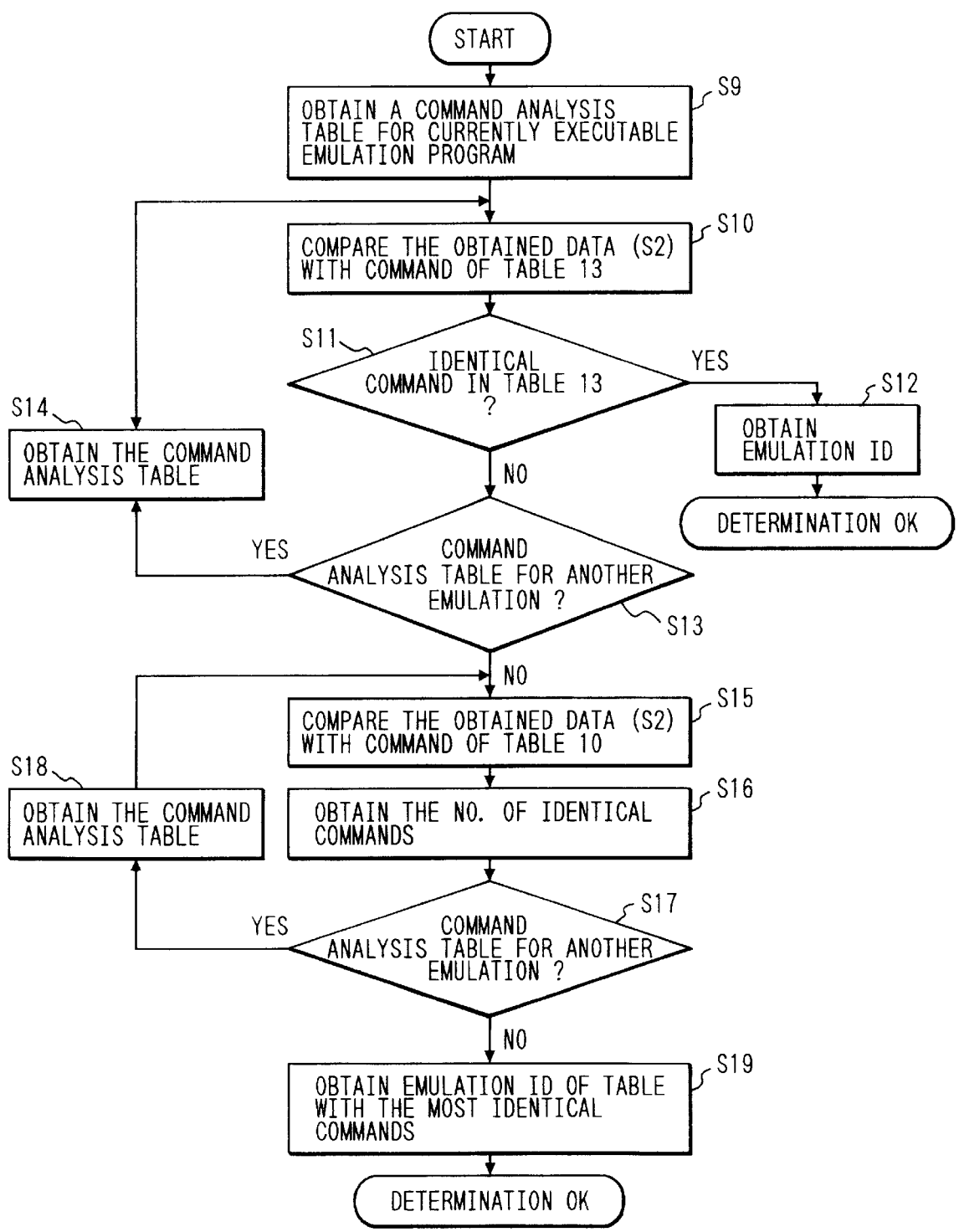
FIG. 5 is a flowchart for explaining a command analysis procedure.

FIG. 1 is a block diagram for explaining the configuration of a printing apparatus in this example. In the figure, a main unit 1 of the printing apparatus receives print data from a host computer 2 which is a data supply source. A CPU 3 totally controls the main unit 1 of the printing apparatus. An input interface 4 inputs print data sent from the host computer 2. A program ROM 5 has a control program stored therein, as shown in the flowchart of FIGS. 3 and 5 and hereinafter described. A font ROM 6 is a ROM which stores the sealable font (character represented by the stroke information but not the dot) corresponding to the character code among the print data which has been input. A built-in RAM 7 is a memory medium for the CPU 3, which is allocated to an input buffer for temporarily storing print data (e.g., the page description language composed of the character code and the control code) input via the input interface 4, a bit map memory for storing bit image data created by the CPU 3, or the work area. An output section 8 is a printer engine for printing.

<Structure of command analysis table>

Figure 2A:
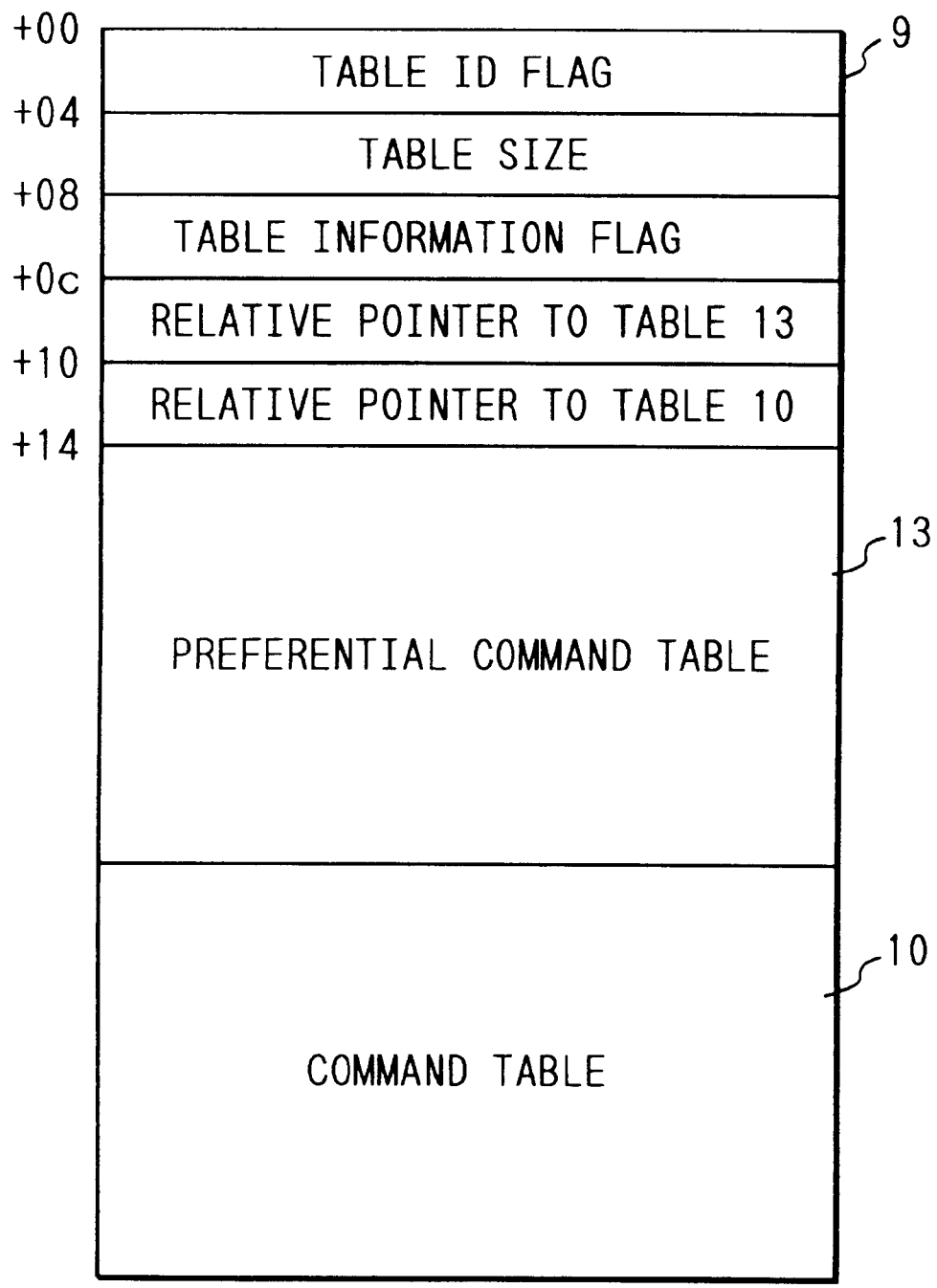
FIGS. 2A and 2B are a configurational diagrams of a command analysis table.
Figure 2B:
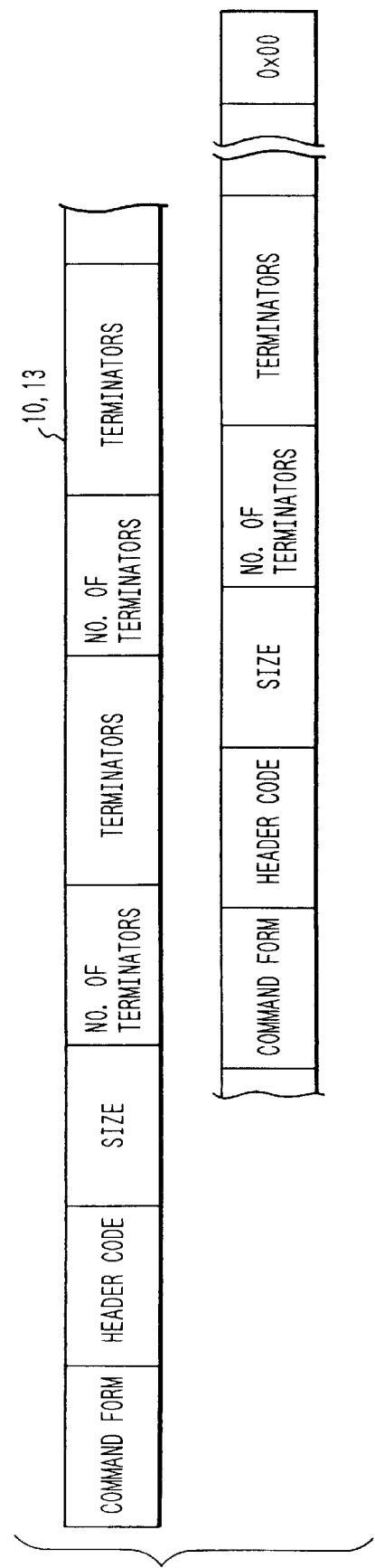

FIGS. 2A and 2B show the structure of a command analysis table prepared for each emulation program, this table being stored in the work area of the RAM 7.

FIG. 2A is a diagram for explaining its configuration, wherein the "table identification flag" is a flag for identifying whether or not the command analysis table 9 is effective, the "table size" is a command analysis table size from the top of the command analysis table, the "table information" is a flag having command information indicating whether the command within the command table following it is control code type or string code type, the "relative pointer to preferential command table" is a relative pointer to preferential command table 13 from the table identification flag, the "relative pointer to command table" is a relative pointer to command table 10 from the table identification flag, the "preferential command table" is a command table of registering the preferential command for determining the emulation program containing its command if at least one such command exist in the print data, and the "command table" 10 is a table for registering the command specific to the emulation program.

Also, since the location is pointed to by the relative pointer, the preferential command table and the command table may not be continuous to the command analysis table main portion.

FIG. 2B is a diagram for explaining the configuration of the command table 10 and the preferential command table 13. The "command form" is a flag indicating the number of bytes of the header code in the registered command, or whether the header code is the control code, or whether the command is composed of the character string alone, one command entry being until the next "command form" field. The "header code" registers the header part of the command specific to the emulation program. The "size" is a size by which the command occupies in the table, which is equal to the length from the "command form" field to the next "command form" field. The "number of terminators" is the number of terminators following the header code of the command, and the "terminator" is a code train following the header code of its command.

<Switching process of emulation program>

FIG. 3 is a configurational diagram of an emulation information part 11 necessary to read the emulation program. FIG. 3 shows the configuration of the emulation information part when the emulation program is provided with a command analysis table. The "emulation identification flag" is a flag identifying whether the emulation program is effective in reading the emulation, the "emulation size" is a size from the base address to the end address of the emulation program, the "relative pointer to command analysis table" is a relative address from the base address to the command analysis table. In accordance with the information of this emulation information part 11, the command analysis table 9 is referenced to determine the emulation program, and the CPU 3 executes the program 12 in accordance with it.

In this way, each emulation program is provided with a command analysis table, and the emulation information and the command analysis information together with the emulation program to implement the emulation are supplied to the work area of the RAM 7 within the printing apparatus, whereby the automatic emulation switching is enabled with a newly supported emulation program.

Figure 4:
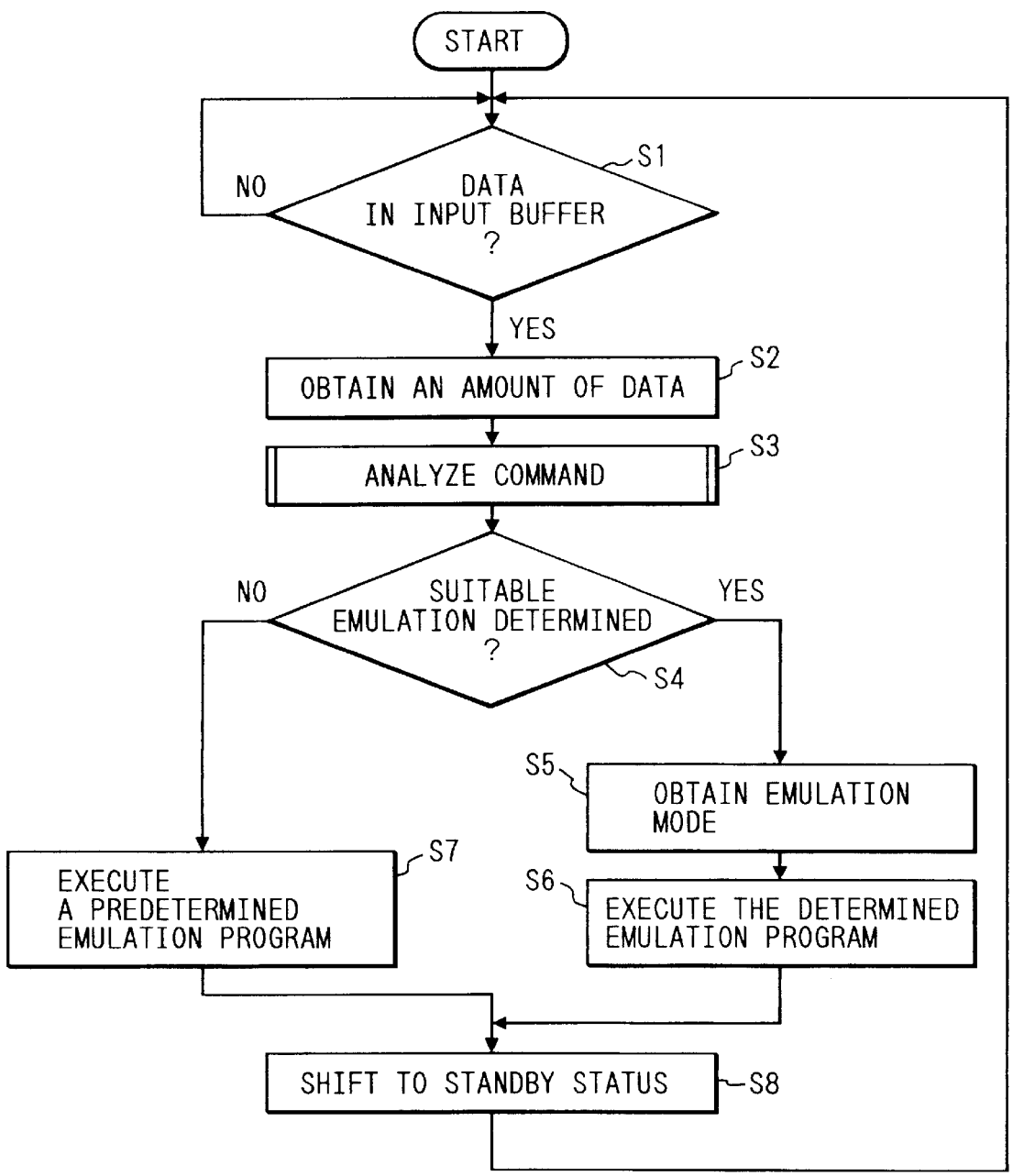
FIG. 4 is a flowchart for explaining an automatic emulation switching procedure.

FIG. 4 is a flowchart for explaining an automatic emulation switching procedure. The flowchart is described below.

Note that the control program shown by this flowchart is stored in the program ROM and executed by the CPU 3.

First, at step S1, a check is made to determine whether or not print data exists in the input buffer within the RAM 7. While there is no input data, the operation is in the print data waiting state. If the print data is accumulated in the input buffer, at step S2, a predetermined amount of print data is obtained from the input buffer within the RAM 7.

Next, at step S3, the command is analyzed to discriminate an emulation program adapted to the received print data. The description of the command analysis is made in accordance with the flowchart of FIG. 5. For example, an emulation program adapted to the page description language A received is discriminated.

Next, at step S4, the discrimination result is checked, and if the program has been discriminated, the operation mode of the emulation program is obtained at step S5, and its emulation program is executed at step S6 to perform the printing process.

If not discriminated, a predetermined emulation program is executed at step S7 to perform the printing process.

After the printing process is ended, the operation shifts to the command analysis standby state at step S8, then the print data waiting state into the input buffer within the RAM 7, and repeated from step S1.

FIG. 5 is a flowchart for explaining specifically the command analysis procedure at step S3 in FIG. 4. This flowchart is described below. Note that the control program shown by this flowchart is stored in the program ROM 5 and executed by the CPU 3.

First, at step S9, one command analysis table for currently executable emulation program in the printing apparatus 1 is obtained from the work area within the RAM 7. Next, at step S10, a certain amount of input data obtained from the input buffer 3 (obtained at step S2) and the command within the preferential command table 13 in the command analysis table are compared. At step S11, a check is made to determine whether identical command in the input buffer exists in the preferential command table 13, and if at least one exists, the comparison process is ended at that time, and at step S12, the emulation program ID of the identical table is obtained from the emulation identification flag, and the operation returns as the discrimination has been made.

If no identical command exists in the preferential command table 13, a check is made to determine whether or not the command analysis table for another emulation program exists, and if it exists, its command analysis table is obtained at step S14, and the obtained input data and the command within the preferential command table 13 are compared again, as previously described. If no other command analysis table exists, the comparison between the obtained data and the command within the command table 10 this time is made at step S15.

Next, at step S16, the number of identical commands is obtained, and at step S17, a check is made to determine whether the command analysis table for another emulation program exists. If another command analysis table exists, the next command analysis table is obtained at step S18, and the obtained data and the command within the command table 10 are compared again, as previously described. If another command analysis table does not exist, the emulation program ID of the table with the most identical commands among the compared command tables 10 is obtained at step S19, and the operation returns.

In this case, it follows that if there are tables with the same number of identical commands, or there is no table with the identical command, a predetermined emulation program ID is returned.

In this way, for each emulation program, by providing a command analysis table to determine the emulation program in correspondence with the emulation program to implement the emulation, the command analysis table is added to the RAM 7 of the printing apparatus, together with the emulation program, when a new emulation program is added, whereby the emulation program can be automatically discriminated from the print data without change of the control program.

Also, for each emulation program, by registering the intrinsic command code as the preferential command in the preferential command table 13, the determination of the emulation program can be expedited.

Also, since the preferential command table 13 or the command table 10 can be extended, a command code characteristic to a certain emulation program can be additionally registered to the table, whereby the determination of the emulation can be made faster, and the determination success rate can be raised.

It is noted that each emulation program may store each table as above mentioned in the flash memory.

Note that the output section 8 of the printing apparatus 1 can comprise various printing schemes, and a laser beam system and an ink jet system are exemplified below.

<Structure of LBP>

Figure 6:
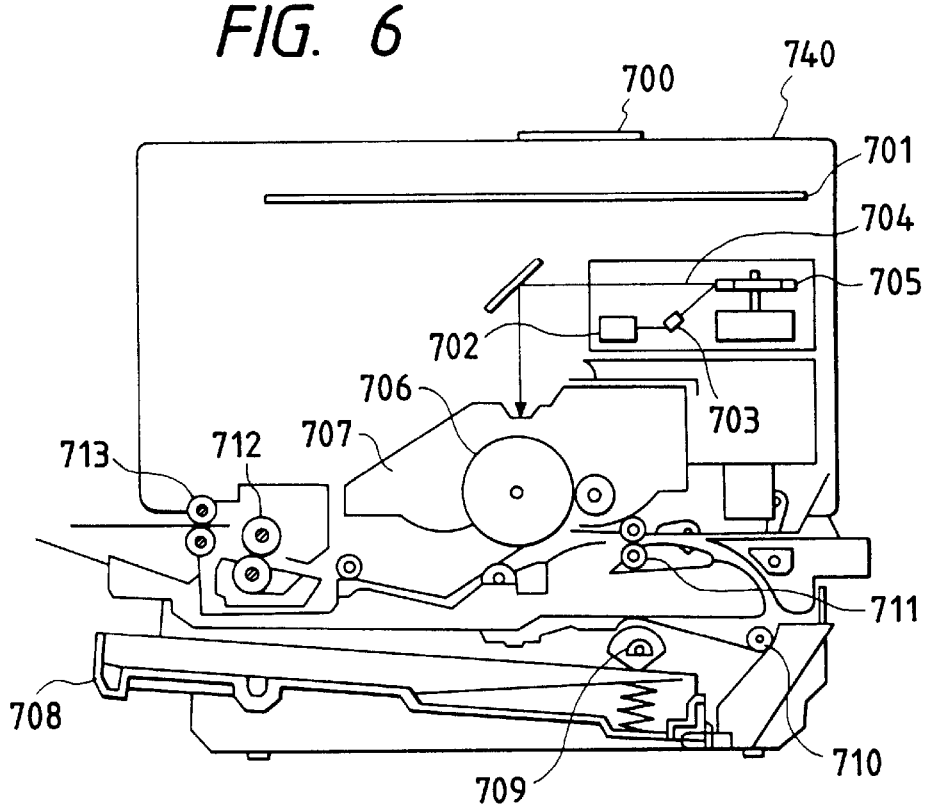
FIG. 6 is a view showing the structure of a laser beam printer.

FIG. 6 is a cross-sectional view showing the internal structure of a laser beam printer (hereinafter referred to as LBP), in which this LBP is capable of inputting the page description language composed of the character code and the control code, for example, and analyzing it, and printing it on the recording paper.

In the figure, 740 is an LBP body, which forms the image on the recording paper which is the recording medium, based on the page description language to be supplied. Reference numeral 700 is an operation panel on which the switches or LED displays for the operation are placed, and 701 is a printer control unit for analyzing the control and page description language for the overall LBP 740. Printer control unit 702 mainly converts the pattern information into the video signal for the output to a laser driver 702.

The laser driver 702 is a circuit for driving a semiconductor laser 703, which switches on or off a laser beam 704 emitted from the semiconductor laser 703 in accordance with the input video signal. The laser beam 704 is deflected to left and right by a rotational polygon mirror 705 to scan over an electrostatic drum 706. Thereby, the character pattern or electrostatic latent image is formed on the electrostatic drum 706. This latent image is developed by a developing unit 707 around the electrostatic drum 706, and then transferred onto the recording paper. This recording paper is in the form of cut sheets, cut sheet recording papers being contained within a sheet cassette 708 attached to the LBP 740, delivered into the apparatus by a paper supply roller 709 and conveying rollers 710, 711, and supplied to the electrostatic drum 706.

<Structure of Ink Jet Printer>

Figure 7:
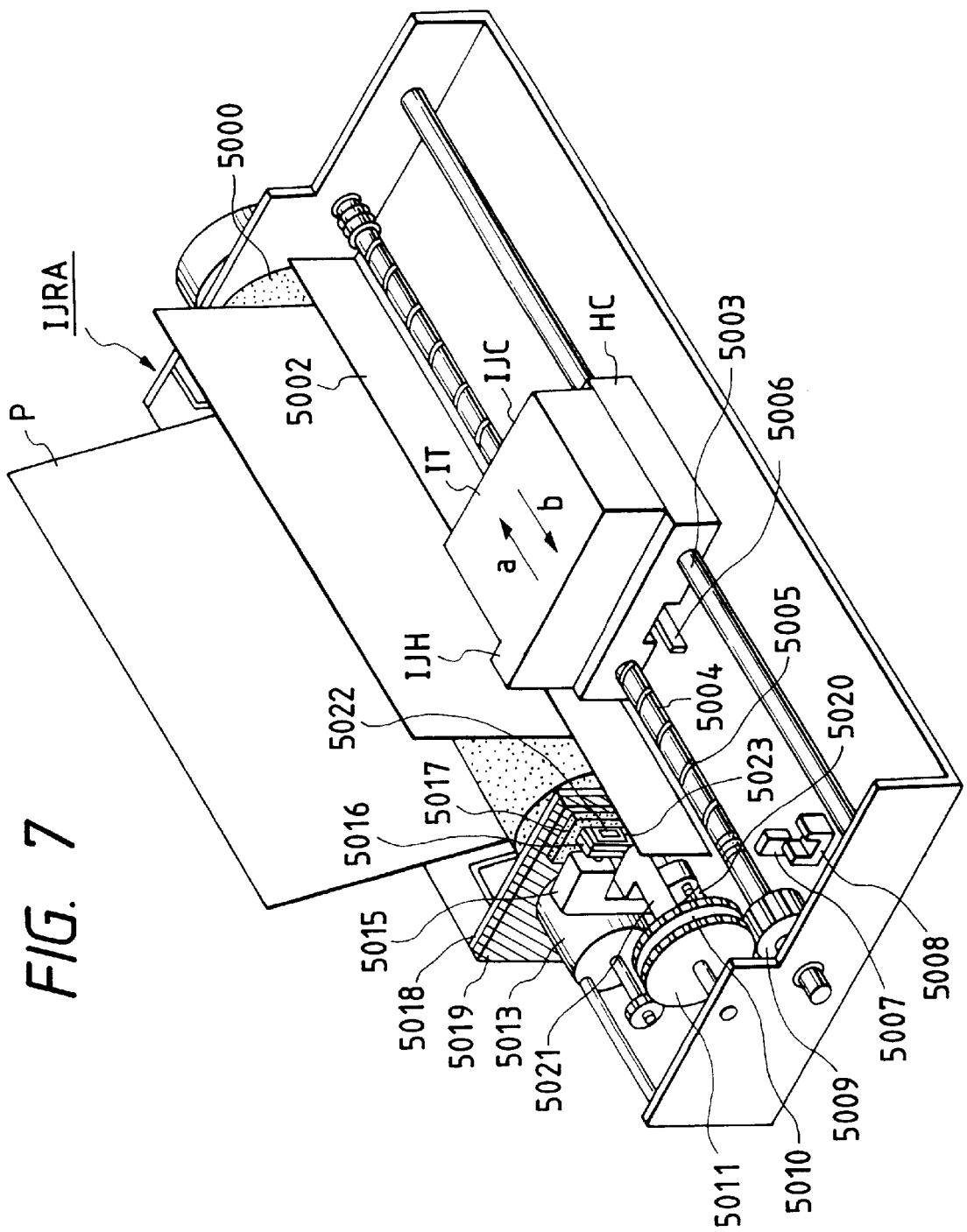
FIG. 7 is a view showing the structure of an ink jet printer.

FIG. 7 is a schematic view of an ink jet recording apparatus IJRA. In the same figure, there is a pin (not shown) on a carriage HC engaging a helical groove 5004 of a lead screw 5005 rotating via driving force transmission gears 5011, 5009, interlocked with the forward and backward rotation of a driving motor 5013, to effect the reciprocal movement in the directions as indicated by the arrow a, b. This carriage HC has an ink jet cartridge IJC mounted. Reference numeral 5002 is a paper presser plate, for pressing the paper onto a platen over the movement direction of carriage. Reference numerals 5007, 5008 are photocouplers, which are home position detecting means for confirming the existence of a lever 5006 of the carriage in this area to switch the rotational direction of the motor 5013. Reference numeral 5016 is a member for supporting a cap member 5022 for capping the front face of the recording head, and 5015 is suction means for sucking the cap inside for the suction recovery of the recording head via an opening 5023 within the cap. Reference numeral 5017 is a cleaning blade, and 5019 is a member for permitting this blade to move forward and backward, these being supported on a support plate 5018 of the main body. It need needless to say that the blade is not take this form, but a well known cleaning blade can be applied to this example. Also, 5021 is a lever to start the suction of the suction recovery, which lever can move along with the movement of a cam 5020 engaging the carriage, a driving force from the driving motor being controlled for the movement by well known transmission means such as clutch switching.

The capping, cleaning and suction recovery are configured to perform respective desired processing at corresponding positions by the action of the lead screw 5005, when the carriage moves to the area on the home position side, but this example is applicable to any form as far as the desired operation is effected at known timing.

[Second example]

Figure 8:
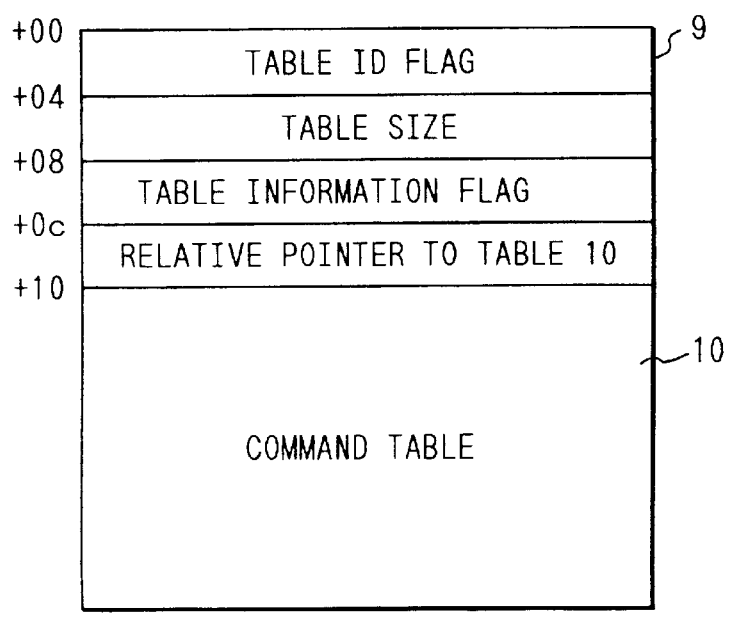
FIG. 8 is a configurational diagram of a command analysis table in a second example.

In the first example, the preferential command table 13 was used, but even if the preferential command table 13 is not provided, the determination of emulation program can be made. FIG. 8 is a diagram showing the configuration of a command analysis table in a second example.

In the figure, the "table identification flag" is a flag identifying whether or not this command analysis table 9 is effective, the "table size" is a command analysis table size from the top of the command analysis table, the "table information" is a flag having command information indicating whether the command within the command table following it is control code type or character string code type, the "relative pointer to command table" is a relative pointer to the command table 10 from the table identification flag, and the "command table" 10 is a table for registering the command specific to its emulation.

Since the location is pointed to by the relative pointer, the command table may not be continuous to the command analysis table main portion.

Figure 9:
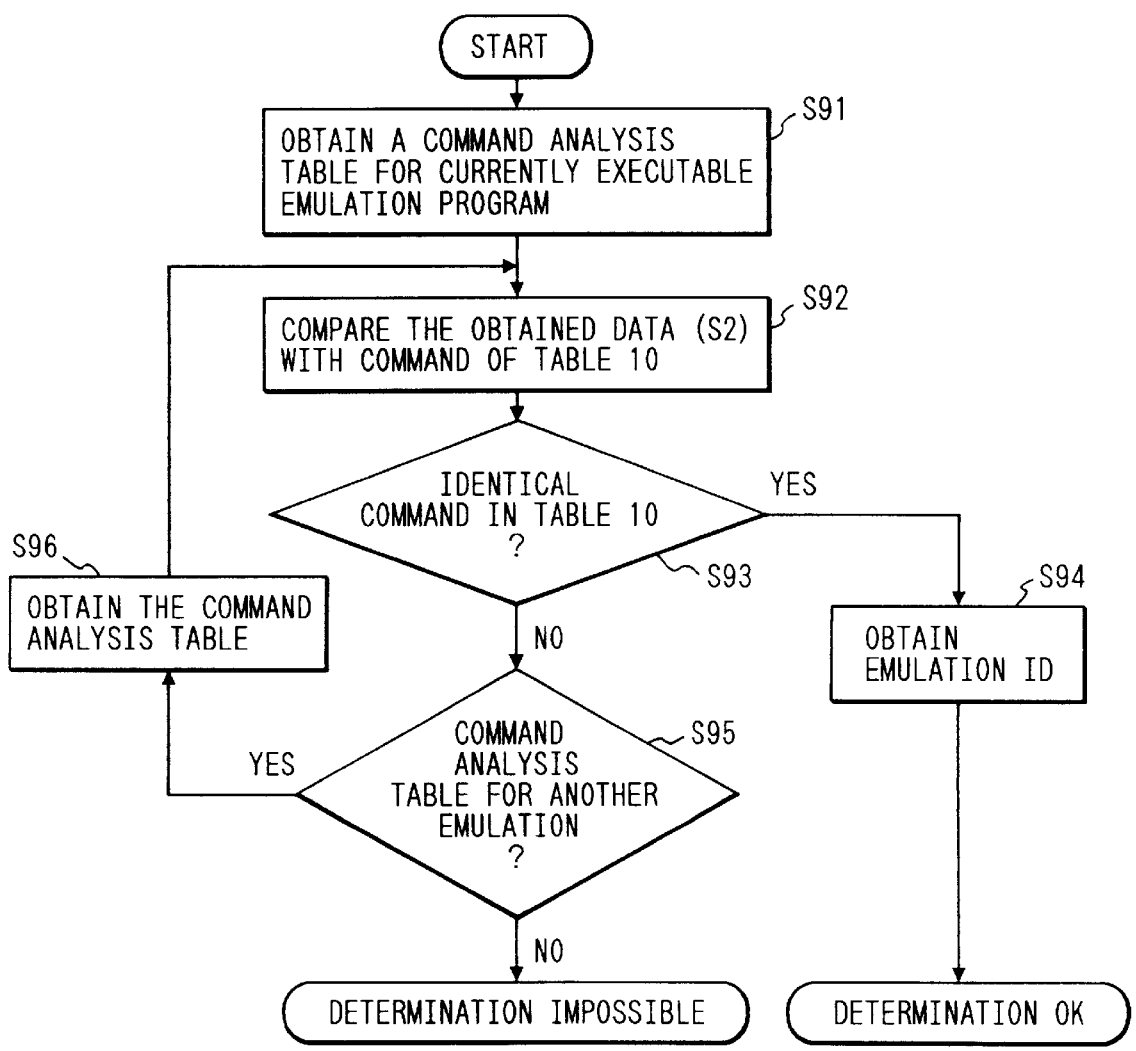
FIG. 9 is a flowchart for explaining a command analysis procedure in the second example.

The printing process using the table of FIG. 8 is the same as shown in FIG. 4, but the command analysis process is slightly different. FIG. 9 is a flowchart for explaining the command analysis procedure in the second example at step S3. This flowchart is described below. Note that the control program shown by this flowchart is stored in the program ROM 5 and executed by the CPU 3.

First, at step S91, one command analysis table for currently executable emulation program in the printing apparatus 1 is obtained from the work area within the RAM 7. Next, at step S92, a certain amount of print data obtained from the input buffer 3 (obtained at step S2) and the command within the command table 10 of the command analysis table are compared.

Then, at step S93, a check is made to determine whether the identical command in the command table 10 exists, and if at least one identical command exists, the comparison process is ended at that time, and at step S94, the emulation program ID of the identical table is obtained from the emulation identification flag, and the operation returns as the discrimination has been made.

If no identical command exists in the command table 10, a check is made to determine whether or not the command analysis table for another emulation program exists at step S95, and if it exists, the command analysis table is obtained from the work area of the RAM 7 at step S96, and the obtained data and the command within the command table 10 are compared again. If no other command analysis table exists, the operation returns as the discrimination is impossible.

By processing in this way, the determination result can be rapidly obtained.

Since the command table and the control program can be made smaller than in the first example, this example is also applicable to the printing apparatus having smaller memory capacity.

Further, when a plurality of emulation programs to be supported contain the command codes which are characteristic to one another, it is possible not only to expedite the processing by registering them in the command table 10, but also to expect the higher rate of determination.

[Third example]

Figure 10A:
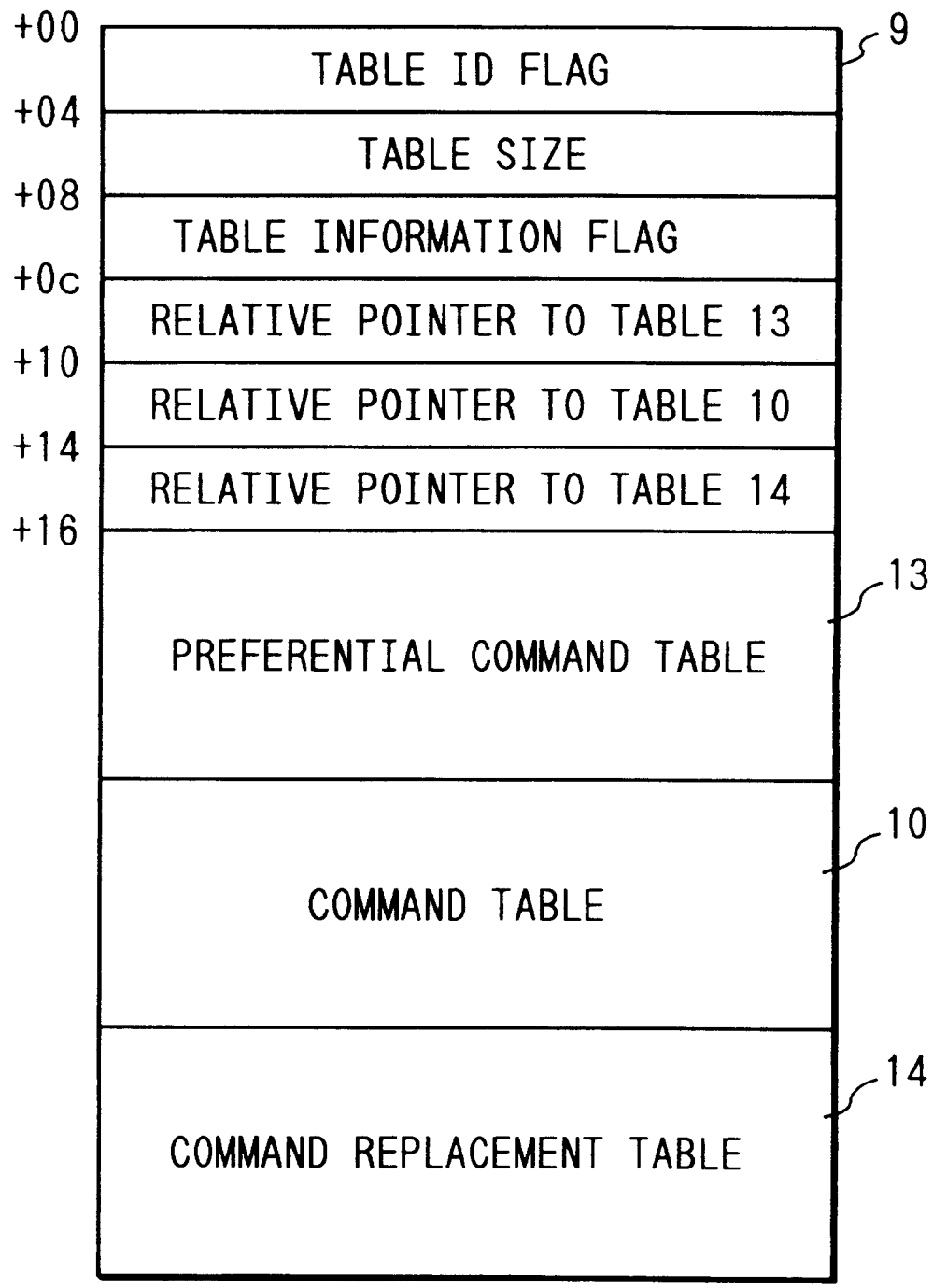
FIGS. 10A to 10C are configurational diagrams of a command analysis table in a third example.
Figure 10B:
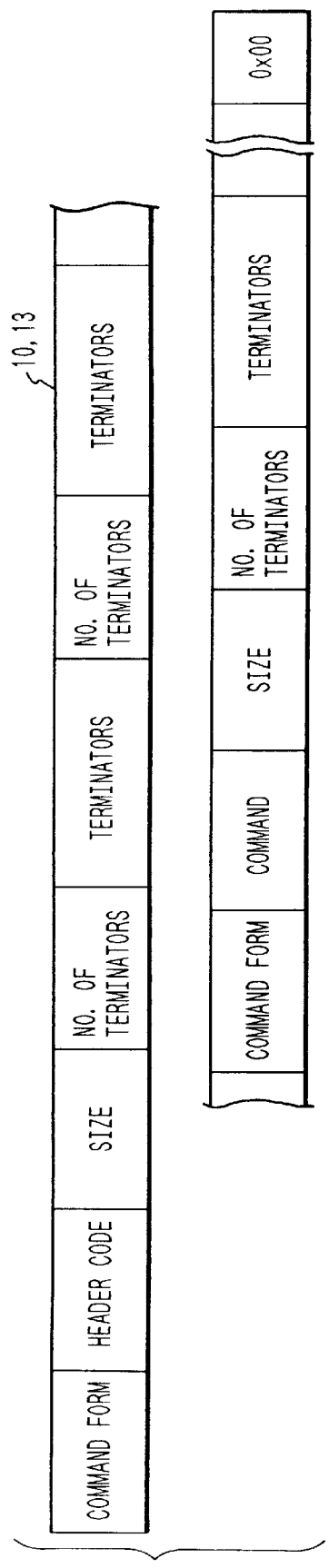
Figure 10C:
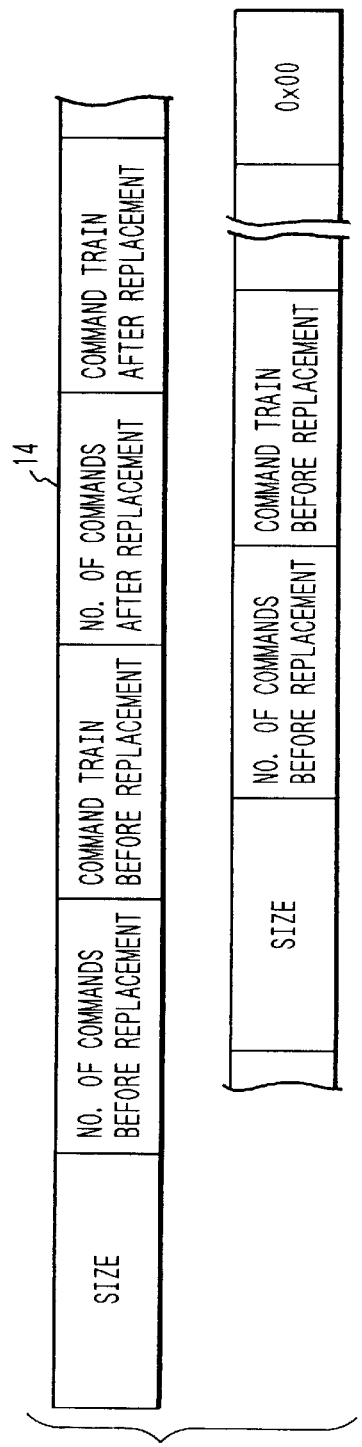

The command analysis table in the first example was shown in FIGS. 2A and 2B, and the command analysis table in the second example was shown in FIG. 8, but the command analysis table in the third example is shown in FIGS. 10A to 10C.

<Structure of command analysis table>

FIGS. 10A to 10C show the structure of a command analysis table prepared for each emulation program in the third example, this table being stored in the work area of the RAM 7.

FIG. 10A is a diagram for explaining its configuration, wherein the "table identification flag" is a flag identifying whether or not this command analysis table 9 is effective, the "table size" is a command analysis table size from the top of the command analysis table, the "table information" is a flag having command information indicating whether the command within the command table following it is control code type or character string code type, the "relative pointer to preferential command table" is a relative pointer to preferential command table 13 from the table identification flag, the "relative pointer to command table" is a relative pointer to command table 10 from the table identification flag, the "relative pointer to command replacement table" is a relative pointer to command replacement table 14 from the table identification flag, the "preferential command table" is a command table of registering the preferential command in which if at least such command exists in the print data, the emulation program containing its command is determined, the "command table" is a table for registering the command specific to its emulation program, and the "command replacement table" is a table for the replacement of the command having the same meaning when there exist multiple commands having the same meaning.

Since the location is pointed to by the relative pointer, the preferential command table, the command table and the command replacement table may not be continuous to the command analysis table main portion.

FIG. 10B is a diagram for explaining the configuration of the command table 10 and the preferential command table 13. The "command form" is a flag indicating the number of bytes of the header code in the command registered, or whether the header code is the control code, or whether the command is composed of the character string alone, one command entry being until the next "command form" field.

The "header code" registers the top part of the command specific to the emulation program. The "size" is a size by which the command occupies in the table, which is equal to the length form the "command form" field to the next "command form" field. The "number of terminators" is the number of terminators following the header code of its command,, and the "terminator" is a code train following the header code of its command.

FIG. 10C is a diagram for explaining the configuration of a command replacement table 14. The "size" is a size of one replacement pair. The "number of commands before replacement" is the number of commands to be replaced, and the "command train before replacement" is a command train to be replaced. The "number of commands after replacement" is the number of commands after the replacement has been made, and the "command train after replacement" is a command train after the replacement has been made.

FIG. 11 is a flowchart for explaining the command analysis procedure in the third example. This flowchart is described below. Note that the control program shown by this flowchart is stored in the program ROM 5 and executed by the CPU 3.

First, at step S9, one command analysis table for currently executable emulation program in the printing apparatus 1 is obtained from the work area within the RAM 7.

Then, at step S31, a check is made to determine whether or not the command replacement table 14 exists in the command analysis table. If the command replacement table is not necessary, NULL is described in the relative pointer to command replacement table 14.

If the command replacement table 14 exists, data replacement occurs in accordance with the command replacement table 14 at step S32. If not, the replacement does not occur.

Then, at step S33, a certain amount of input data obtained and the command within the preferential command table 13 in the command analysis table are compared. At step S34, a check is made to determine whether the identical command in the preferential command table 13 exists, and if at least one command exists, the comparison process is ended at that time, and at step S35, the emulation program ID of the identical table is obtained, and the operation returns as the determination has been made.

If no identical command exists in the preferential command table 13, a check is made to determine whether or not the command analysis table for another emulation program exists at step S36, and if it exists, its command analysis table is obtained at step S37, and the obtained data and the command within the preferential command table 13 are compared again. If no other command analysis table exists, the obtained data and the command within the command table 10 this time are compared at step S38.

Next, at step S39, the number of identical commands is obtained, and at step S40, a check is made to determine whether the command analysis table for another emulation program exists. If another command analysis table exists, the next command analysis table is obtained at step S41, where a check is made to determine whether or not the command replacement table exists, and if it exists, the data is replaced at step S42. If the command replacement table 14 does not exist, and the obtained data and the command within the command table 10 are compared again.

If another command analysis table does not exist, the emulation program ID of the table with most identical commands in the compared command table 10 is obtained at step S43, and the operation returns.

In this case, when there are tables having the same number of identical commands, or when there is none having identical command, a predetermined emulation program ID is returned.

As above described, when a plurality of commands having the same meaning exist for each emulation program, the command replacement table 14 is added, and the replacement of command occurs before the retrieval of command, whereby the retrieval processing speed can be raised.

It should be understood that the present invention may be applied to the system consisting of a plurality of apparatuses, or the system consisting of a single apparatus. Also, it should be understood that the present invention can be applied to the system or the apparatus which is supplied with the program.

As above described, the printing apparatus and its control method according to the present invention can discriminate the emulation program from the input print data in short time, and further can readily deal with the addition of a new emulation program or the addition of command to the existing emulation program.

Also, for each emulation program, by registering the intrinsic command code as the preferential command in the preferential command table, the determination of emulation program can be expedited.

Also, since the preferential command table or the command table can be extended, the command can be additionally registered to the table when the command code characteristic to the emulation program is added, whereby the determination of emulation program is expedited, and the success rate of determination can be improved.

Also, since the command table and the control program can be made smaller, there is effect that the invention can be applied to the printing apparatus having smaller memory capacity.

What is claimed is:

1. A printing apparatus which has a plurality of emulation programs and analyzes input data based on one of the plurality of emulation programs, said apparatus comprising:

replacement means for replacing a plurality of different commands having a common meaning included in the input data by a predetermined different command having the common meaning using a command replacement table;

comparison means for comparing the predetermined different command replaced by said replacement means with a command in a command table; and selection means for selecting one of the plurality of emulation programs corresponding to the command in the command table in response to the comparison.

2. An apparatus according to claim 1, further comprising memory means for storing one command replacement table and one command table in correspondence to each one of the plurality of emulation programs, wherein said replacement means replaces the plurality of different commands by the predetermined different command using the command replacement table, stored in said memory means, corresponding to a predetermined one of the plurality of emulation programs; and wherein said comparison means makes a comparison between the replaced predetermined different command and the command in the command table, stored in said memory means, corresponding to the predetermined one emulation program and therein said selection means determines whether to select the predetermined one emulation program in response to the comparison.

3. An apparatus according to claim 2, wherein if said selection means determines not to select the predetermined one emulation program, said replacement means replaces the plurality of different commands by another predetermined different command using the command replacement table, stored in said memory means, corresponding to another one of the plurality of emulation programs, and said comparison means makes a comparison between the replaced another predetermined different command and the command in the command table, stored in said memory means, corresponding to the another one emulation program and said selection means determines whether to select the another one emulation program in response to the comparison.

4. An apparatus according to claim 1, further comprising print means for printing the input data analyzed based on the one emulation program selected by said selection means.

5. An apparatus according to claim 1, further comprising memory means for storing an additional emulation program together with a command replacement table and a command table corresponding to the additional emulation program.

6. A printing method for analyzing input data based on one of a plurality of emulation programs, said method comprising the steps of:

replacing a plurality of different commands having a common meaning included in the input data by a predetermined different command having the common meaning using a command replacement table;

comparing the predetermined different command replaced in said replacing step with a command in a command table; and selecting one of the plurality of emulation programs corresponding to the command in the command table in response to the comparison.

7. A method according to claim 6, further comprising a step of:

storing one command replacement table and one command table in correspondence to each one of the plurality of emulation programs, wherein said replacing step replaces the plurality of different commands by the predetermined different command using the command replacement table, stored in said storing step, corresponding to a predetermined one of the plurality of emulation programs; and wherein said comparing step compares the replaced predetermined different command and the command in the command table, stored in said storing step, corresponding to the predetermined one emulation program and wherein said selecting step determines whether to select the predetermined one emulation program in response to the comparison.

8. A method according to claim 7, wherein if the predetermined one emulation program is not selected in said selecting step, the plurality of different commands are replaced in said replacing step by another predetermined different command using the command replacement table, stored in said storing step, corresponding to another one of the plurality of emulation programs, and, in said comparing step a comparison is made between the another predetermined different command and the command in the command table, stored in said storing step, corresponding to the another one emulation program and said selecting step determines whether to select the another one emulation program in response to the comparison.

9. A method according to claim 6, further comprising a step of printing the input data analyzed based on the one emulation program selected in said selecting step.

10. A computer-readable memory medium storing a program thereon for performing a printing method which analyzes input data based on one of a plurality of emulation programs, the method comprising the steps of:

replacing a plurality of different commands having a common meaning included in the input data by a predetermined different command having the common meaning using a command replacement table;

comparing the predetermined different command replaced in said replacing step with a command in a command table; and selecting one of the plurality of emulation programs corresponding to the command in the command table in response to the comparison.

11. A computer-readable memory medium according to claim 10, the method performed by the program stored on the medium further comprising a step of:

storing one command replacement table and one command table in correspondence to each one of the plurality of emulation programs, wherein said replacing step replaces the plurality of different commands by the predetermined different command using the command replacement table, stored in said storing step, corresponding to a predetermined one of the plurality of emulation programs; and wherein said comparing step compares the predetermined different command and the command in the command table, stored in said storing step, corresponding to the predetermined one emulation program and wherein said selecting step determines whether to select the predetermined one emulation program in response to the comparison.

12. A computer-readable memory medium according to claim 11, wherein if the predetermined one emulation program is not selected in said selecting step, the plurality of different commands are replaced in said replacing step by another predetermined different command using the command replacement table, stored in said storing step, corresponding to another one of the plurality of emulation programs, and, in said comparing step a comparison is made between another predetermined different command and the command in the command table, stored in said storing step, corresponding to the another one emulation program and said selecting step determines whether to select the another one emulation program in response to the comparison.

13. A computer-readable memory medium according to claim 10, the method performed by the program stored on the medium further comprising a step of:

printing the input data analyzed based on the one emulation program selected in said selecting step.

\* \* \* \* \*

UNITED STATES PATENT AND TRADEMARK OFFICE
CERTIFICATE OF CORRECTION

PATENT NO. : 6,002,843
DATED : December 14, 1999
INVENTOR(S) : Yasushi Mochizuki It is certified that error appears in the above-identified patent and that said Letters Patent is hereby corrected as shown below:

Column 2,
Line 4, "program," should read -- programs, --; and
Line 20, "are a" should read -- are --.

Column 3,
Line 20, "exist" should read -- exists --;
Line 35, "by" should be deleted; and
Line 36, "which" should be delete.

Column 6,
Line 13, "need" should read -- is --; and
Line 14, "is not" should read -- need not --.

Column 8,
Line 2, "by" should be deleted;
Line 4, "form" (first occurrence) should read -- from --;
Line 7, "command, , " should read -- command, --; and
Line 62, "and the" (first occurrence) should read -- the --.

Column 9,
Line 32, "is effect" should read -- is the effect --; and
Line 64, "therein" should read -- wherein --.

Column 11,
Line 20, "programs, wherein" should read -- programs, ¶wherein --.

UNITED STATES PATENT AND TRADEMARK OFFICE
CERTIFICATE OF CORRECTION

PATENT NO. : 6,002,843
DATED : December 14, 1999
INVENTOR(S) : Yasushi Mochizuki It is certified that error appears in the above-identified patent and that said Letters Patent is hereby corrected as shown below:

Column 12,
Line 14, "another" should read -- the another --.

Signed and Sealed this

Twenty-fifth Day of December, 2001

*Attest:*

*Attesting Officer*

JAMES E. ROGAN
*Director of the United States Patent and Trademark Office*